(12) United States Patent
Bushell

(10) Patent No.: US 8,179,976 B2
(45) Date of Patent: May 15, 2012

(54) CONTROL OF VIDEO DECODER FOR REVERSE PLAYBACK OPERATION

(75) Inventor: John Samuel Bushell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1161 days.

(21) Appl. No.: 12/013,268

(22) Filed: Jan. 11, 2008

(65) Prior Publication Data

US 2009/0180533 A1 Jul. 16, 2009

(51) Int. Cl.
*H04N 11/02* (2006.01)

(52) U.S. Cl. ......... 375/240.25; 375/204.01; 375/240.12

(58) Field of Classification Search .................... 386/68; 348/426.1; 375/240, 240.01, 240.16, 240.24–240.29
See application file for complete search history.

(56) References Cited

U.S. PATENT DOCUMENTS

| | | | | |
|---|---|---|---|---|
| 7,539,393 B2* | 5/2009 | Dunbar et al. | | 386/347 |
| 7,627,227 B2* | 12/2009 | Evans et al. | | 386/347 |
| 2003/0103566 A1* | 6/2003 | Stenzel | | 375/240.12 |
| 2004/0131118 A1* | 7/2004 | Kim et al. | | 375/240.12 |
| 2004/0252970 A1* | 12/2004 | Noh et al. | | 386/68 |
| 2005/0169371 A1* | 8/2005 | Lee et al. | | 375/240.03 |
| 2006/0008248 A1* | 1/2006 | Agrahara | | 386/68 |
| 2006/0188016 A1* | 8/2006 | Gould | | 375/240.12 |
| 2007/0025688 A1* | 2/2007 | Pejhan | | 386/68 |
| 2007/0098072 A1* | 5/2007 | Aggarwal et al. | | 375/240.12 |
| 2008/0298769 A1* | 12/2008 | Johnson et al. | | 386/68 |

* cited by examiner

*Primary Examiner* — Kwang B Yao
*Assistant Examiner* — Nguyen Ngo
(74) *Attorney, Agent, or Firm* — Kenyon & Kenyon LLP

(57) ABSTRACT

A video decoder includes a mode of operation for reverse playback that includes dividing a sequence of coded video data into groups of pictures (GOPs) and further subdividing the groups of pictures into a plurality of spans. GOPs extend in coding order from a first key frame to a terminal frame that precedes another key frame in coding order. Each span is processed in reverse coding order by decoding the first key frame and any reference frames that precede the currently processed span in coding order, selecting a plurality of frames from the currently processed span for decode and display and further selecting for decode but not display any reference frames from the currently processed span that were omitted by the first selection. All selected frames are decoded but only those marked for display are rendered at a display device. The method accommodates control parameters that define the number of spans selected from each GOP and the number of frames selected from each span for decoded and display. Via these control parameters, operation of the method may be tuned to local decoding environments for which processing resources and decoded picture buffer sizes may be unknown.

28 Claims, 8 Drawing Sheets

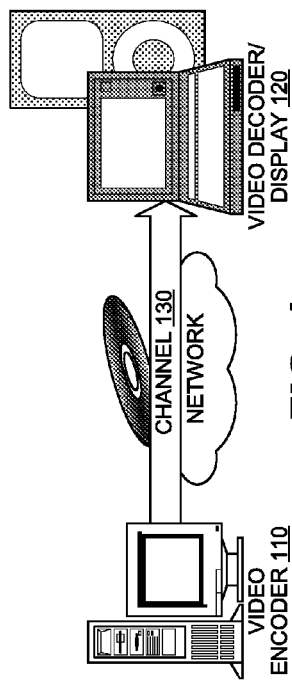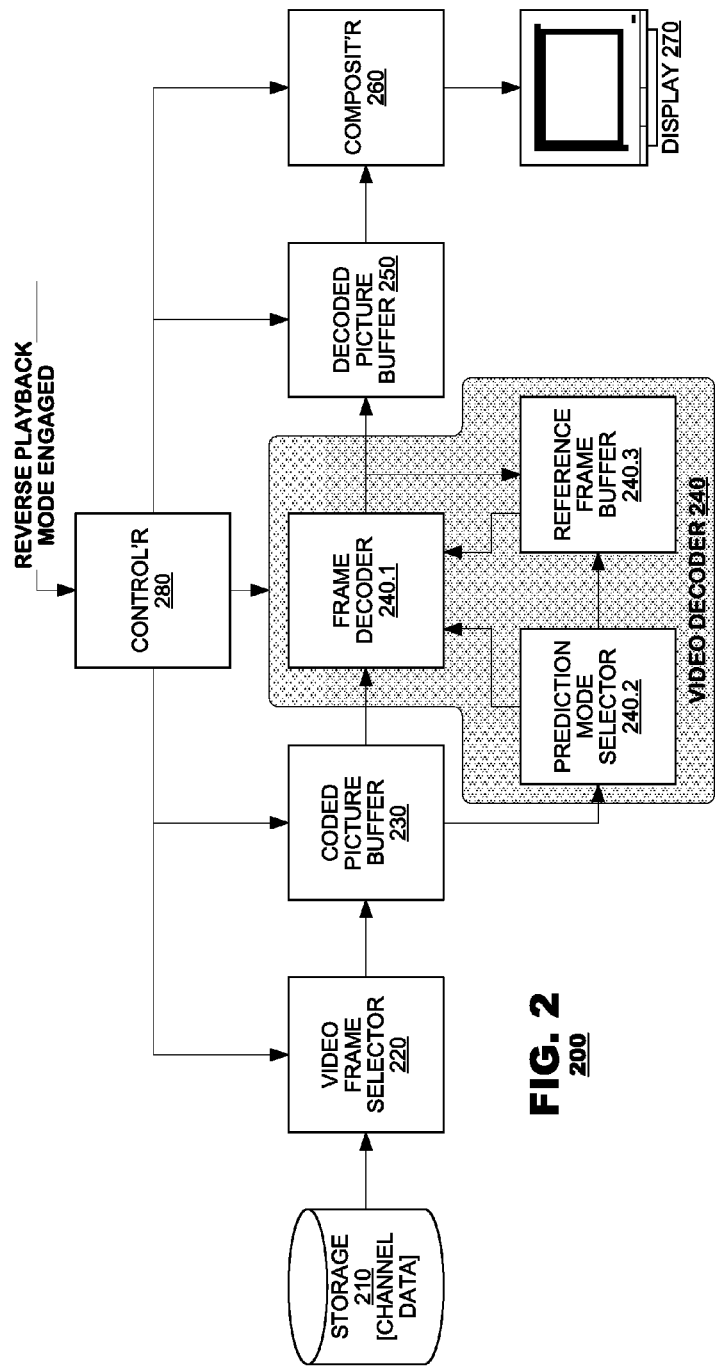

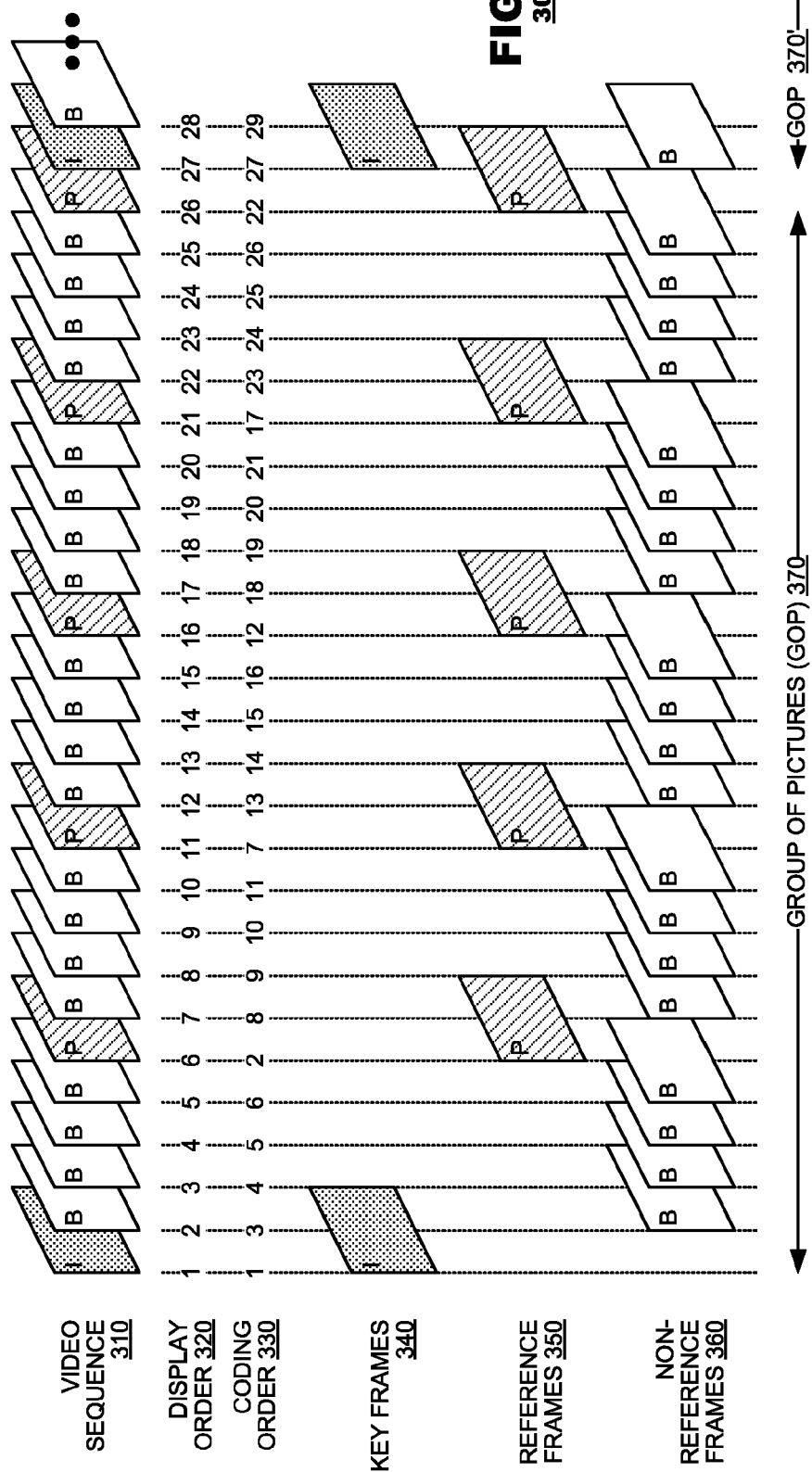

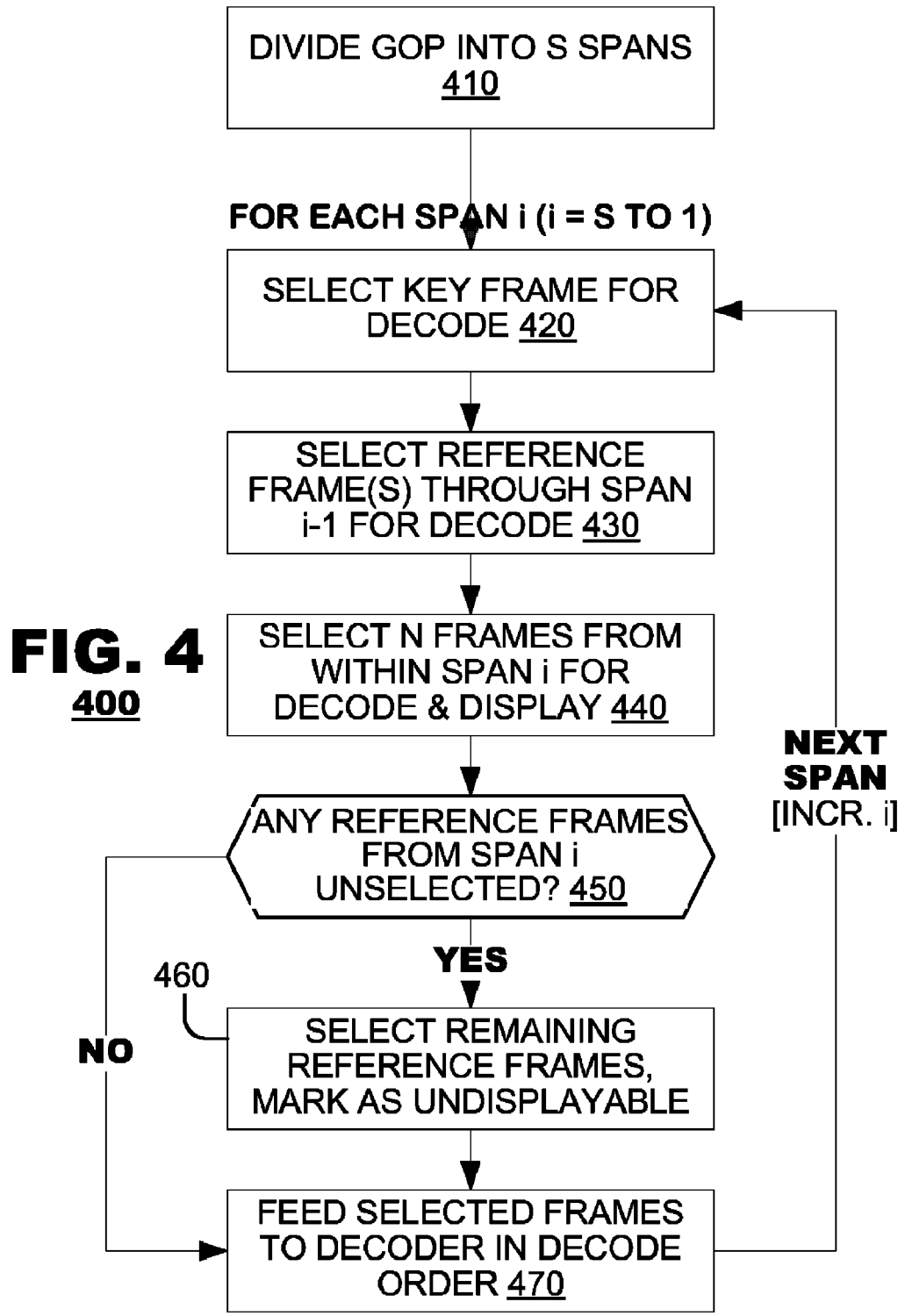

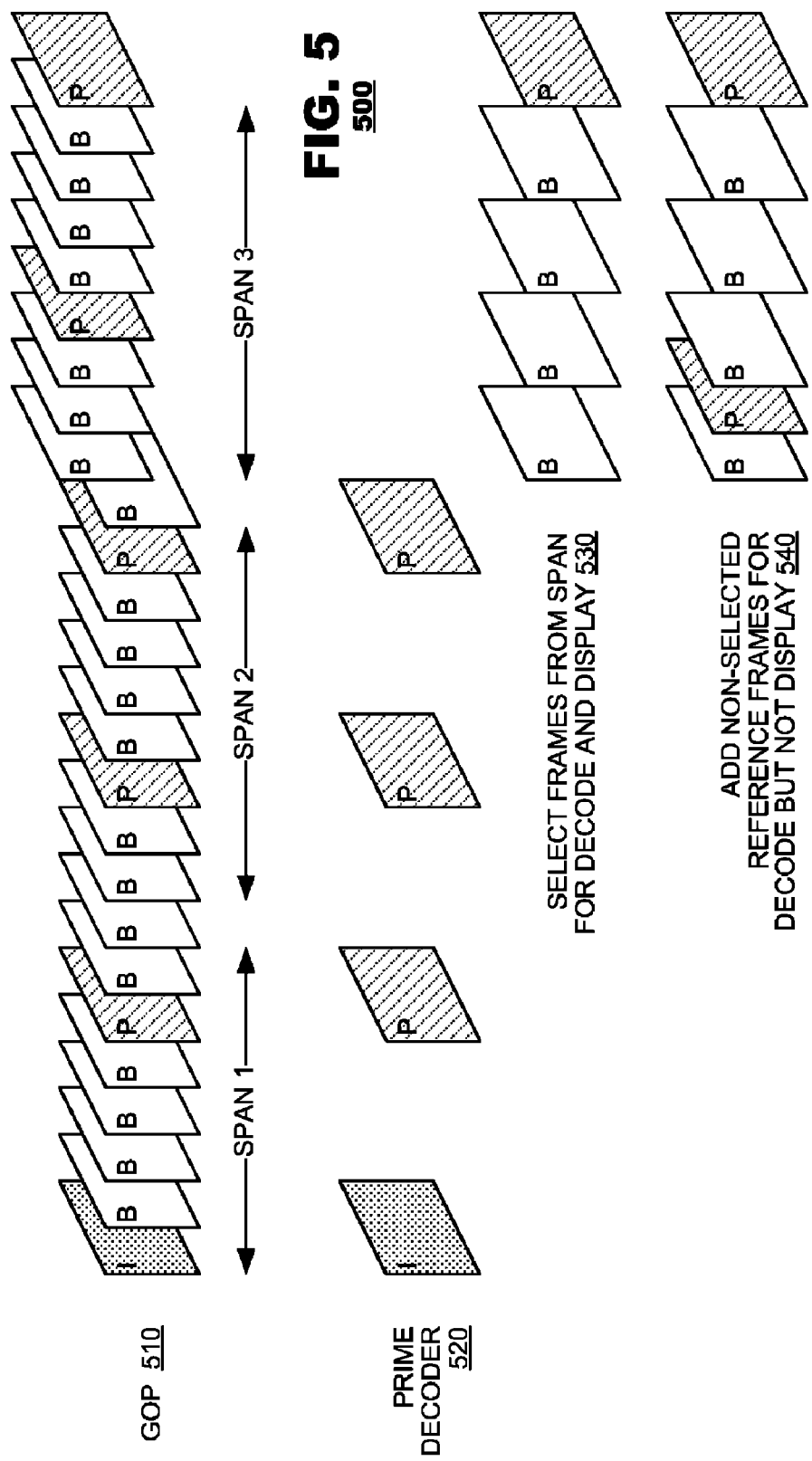

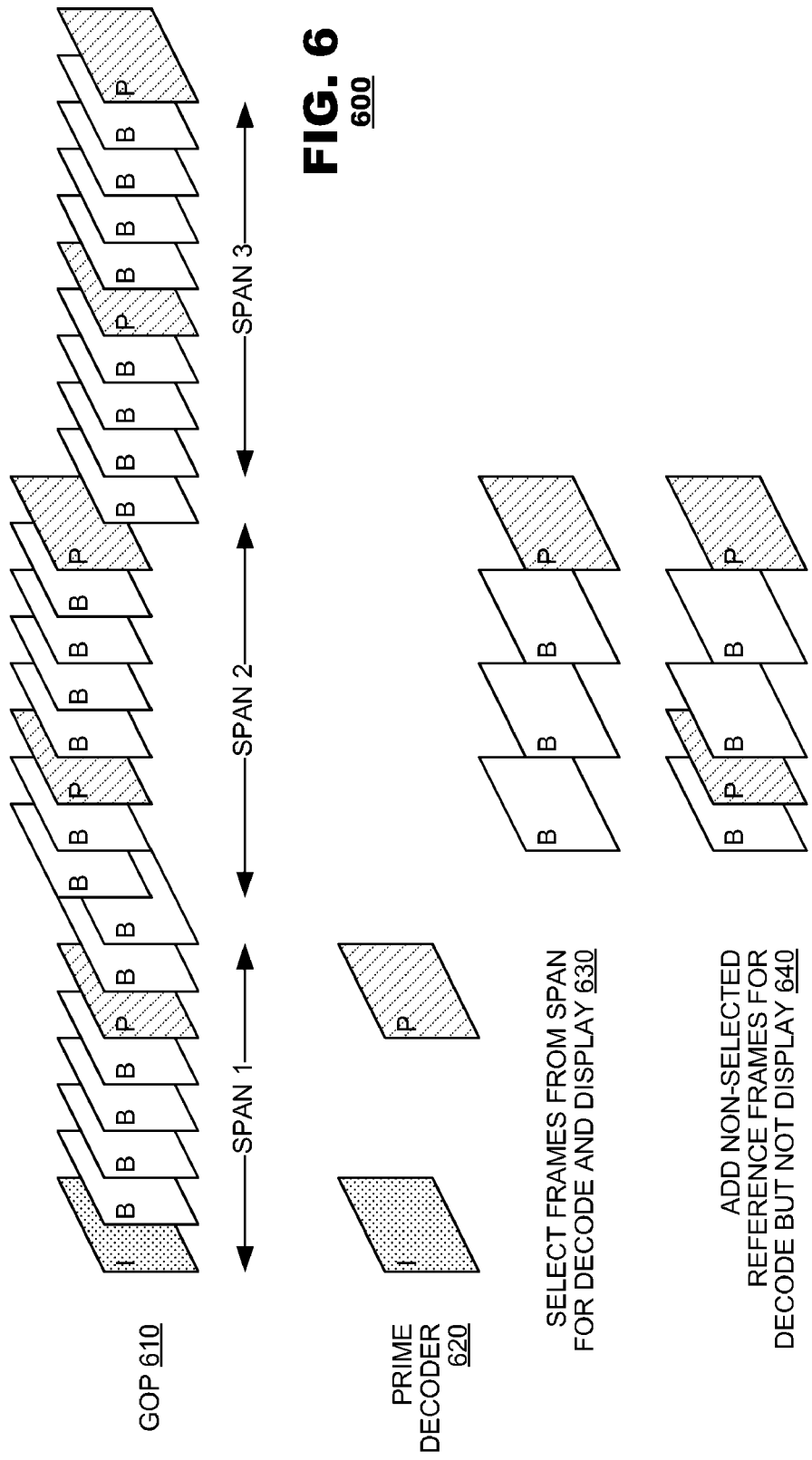

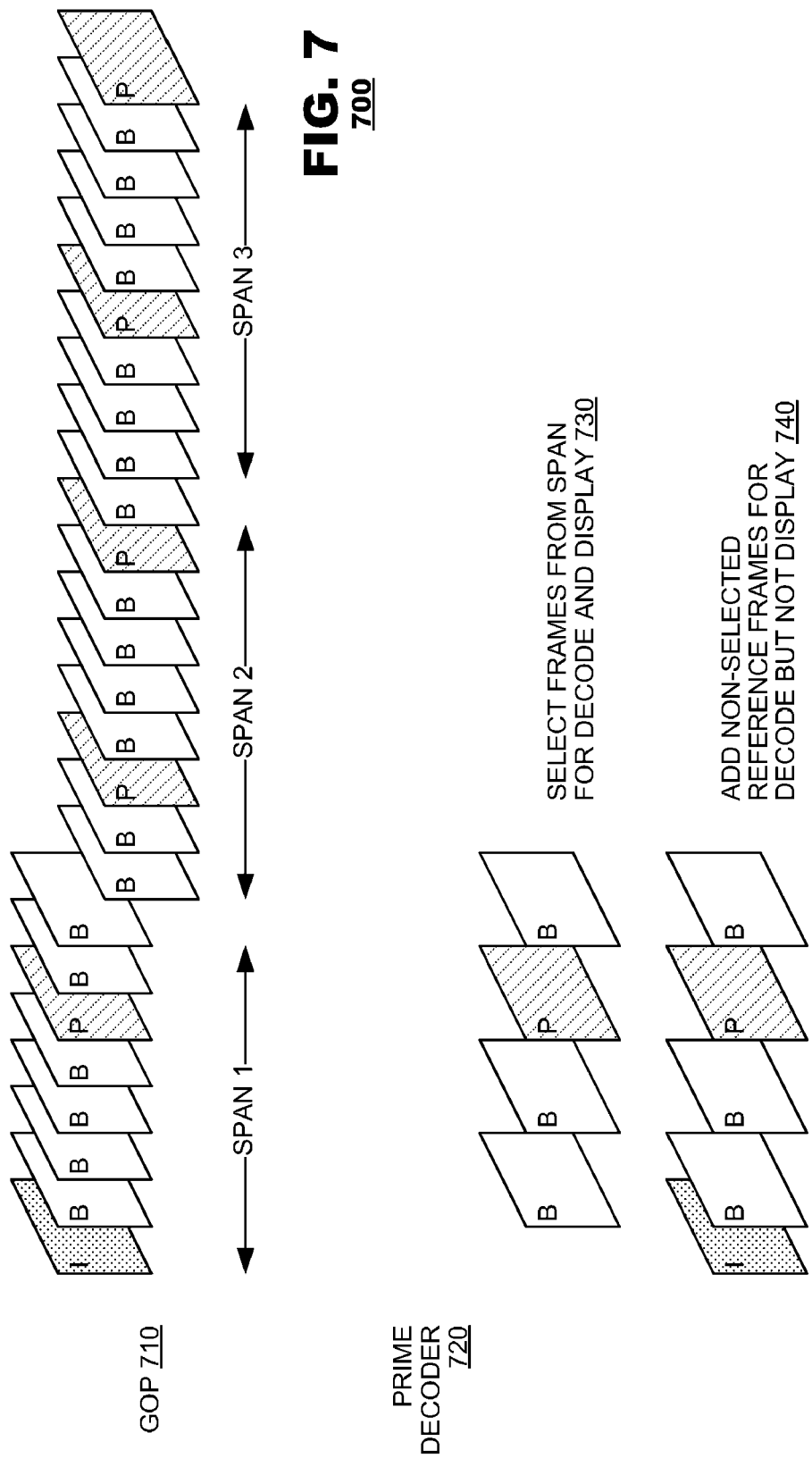

800

900

CONTROL OF VIDEO DECODER FOR REVERSE PLAYBACK OPERATION

BACKGROUND

Video decoder systems are well known components of consumer electronic devices, such as personal computers, media players, video games and the like. They process a coded video bit stream, which is a compressed representation of a source video sequence, to generate a replica of the video sequence for local display. The consumer electronic devices render the video sequence according to a default display order but typically also support various enhanced playback modes, commonly fast forward and reverse playback. The present invention is directed to control methods for reverse playback.

Video coding typically exploits temporal redundancies among frames in a video sequence and generates coded video data that contains prediction references between frames. Often prediction references create multi-frame prediction chains, which must be traversed entirely during decode to regenerate the source video sequence. For this reason, a decoder cannot select and decode a desired video frame on a purely random access basis. Nor can a decoder work backwards through the coded video data, when operating in a reverse playback mode, decoding and rendering frames as it goes.

Prior attempts to implement reverse playback in video decoders generally operate in one of several ways. In an extremely simple case, a video decoder may decode only those frames which have no coding dependencies upon other frames (e.g., I frames) and skip all other frames. The acceptability of this approach depends on how frequently the I frames appear in coded video data. If every frame is coded as an I frame, reverse playback will look perfect. If the I frames occur infrequently in the coded video data, reverse playback cannot be presented as smooth video; reverse playback would be more akin to a slideshow. Because I frames often are extremely sparse in coded video data to optimize video compression performance (less than one frame in every hundred frames), there is a need for reverse playback algorithms that display more than just the I frames.

Other solutions to achieve reverse playback attempt to decode each coded video frame in reverse decoding order, which includes for each frame of interest decoding all frames that serve as prediction references. This approach is computationally expensive and can require reference frames to be decoded multiple times as the video decoder works backward through the coded video sequence in display order. Often, video decoders cannot complete full decode operation in the time available under the display's display rate, which may cause the video decoders to drop frames from decode and degrade video quality. Still other solutions attempt to decode an entire prediction chain in natural coding order and buffer the decoded video data for display in a reverse playback mode. This approach also is expensive, requiring large memory spaces to be allocated for this purpose. If adequate memory space is unavailable for reverse playback, frames may have to be dropped and video quality may be degraded.

Accordingly, there is a need in the art for a reverse playback control method for a video decoder that conserves resources and retains adequate video quality on playback.

BRIEF DESCRIPTION OF THE DRAWINGS

FIG. 1 illustrates a video distribution system for use with the present invention.

FIG. 2 is a simplified block diagram of a video decoder for use with the present invention.

FIG. 3 illustrates an exemplary video sequence.

FIG. 4 is a flow diagram of a decoder control method according to an embodiment of the present invention.

FIGS. 5-7 illustrate application of the method of FIG. 4 to exemplary video data.

DETAILED DESCRIPTION

Figure 8:
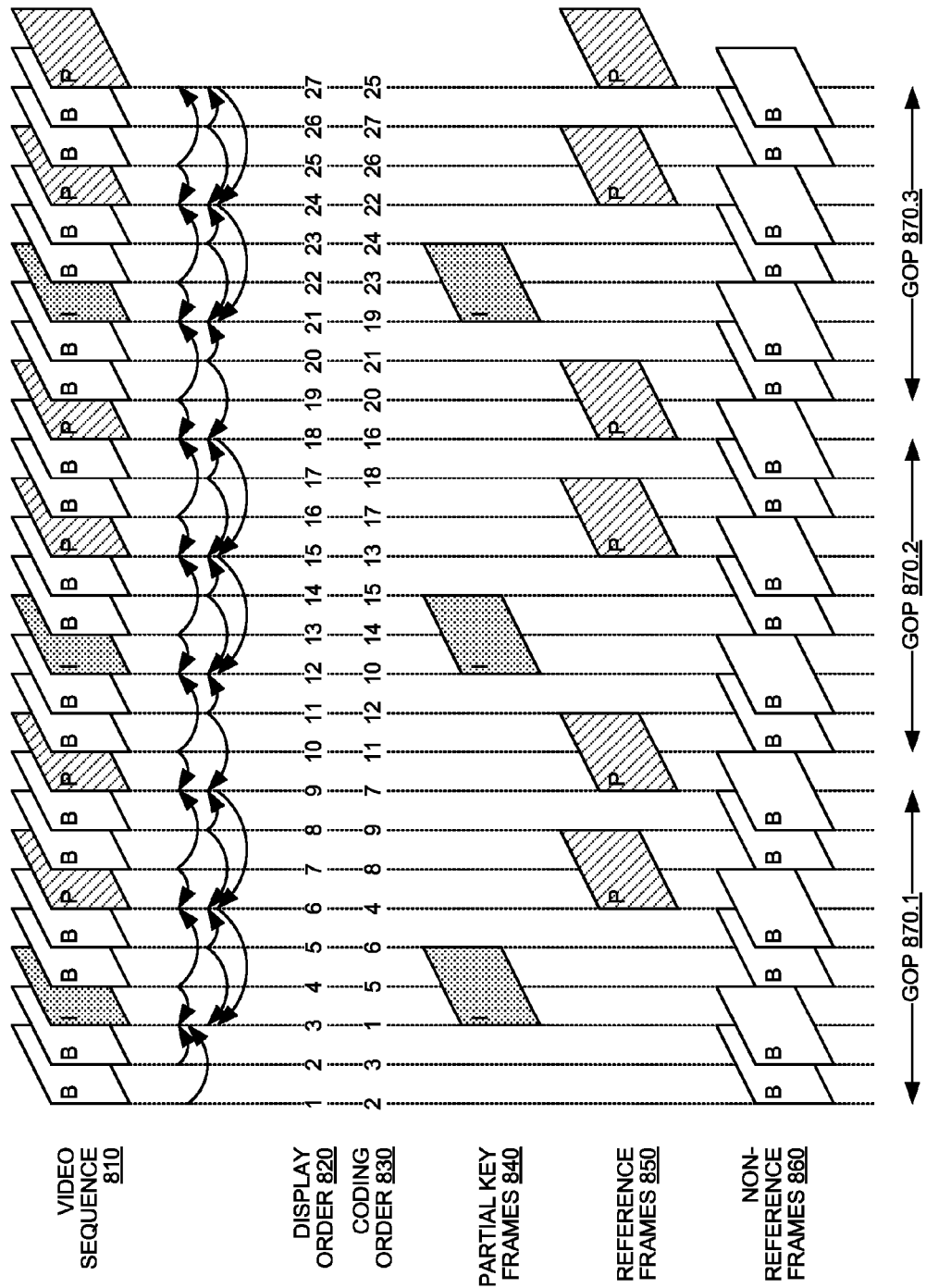
FIG. 8 illustrates another exemplary video sequence.

Embodiments of the present invention provide a video decoder control method providing reverse playback support that includes dividing a sequence of coded video data into groups of pictures (GOPs) and further subdividing the groups of pictures into a plurality of spans. GOPs extend in coding order from a first key frame to a terminal frame that precedes another key frame in coding order. Each span is processed in reverse coding order by decoding the first key frame and any reference frames that precede the currently processed span in coding order, selecting a plurality of frames from the currently processed span for decode and display and further selecting for decode but not display any reference frames from the currently processed span that were omitted by the first selection. All selected frames are decoded but only those marked for display are rendered at a display device. The method accommodates control parameters that define the number of spans selected from each GOP and the number of frames selected from each span for decoded and display. Via these control parameters, operation of the method may be tuned to local decoding environments for which processing resources and decoded picture buffer sizes may be unknown.

FIG. 1 illustrates a video distribution system 100 according to an embodiment of the present invention. The system 100 includes a video encoder 110 coupled to a video decoder 120 via a channel 130. The video coder 110 codes a source video sequence according to a predefined coding scheme, generating coded video data therefrom. Depending on implementation, the video coder 110 may store the coded video data for subsequent distribution. Distribution may occur via channel 130, for example, over a communication channel provided by electrical, magnetic or optical communication networks (e.g., wireline communication systems) or via distributable storage media such as electrical, magnetic or optical memories.

A video decoder 120 receives the coded video data from the channel 130 and stores it for decode. During decoding, the video decoder 120 generates a recovered video sequence, a replica of the source video sequence from which the coded video data had been generated. The video decoder's 120 decoding process inverts a coding process that had been applied at the video coder 110. Often, a video decoder 120 displays the recovered video sequence on a display device (e.g., a monitor).

Video decoders 120 often are integrated into a variety of consumer electronics products, such as personal computers, laptop computers, portable media players, DVD players, video game systems and the like. Some of these consumer electronics products provide their video decoders in hardware, often dedicated integrated circuits, that perform the decoding processes in dedicated decode circuits. Others of the consumer electronics products provide their video decoders in software that perform the decoding processes via program routines executing on general purpose processors. There can be wide disparities among the various decoders in terms of the processing and memory resources that can be provided to a decoding process.

FIG. 2 is a simplified block diagram of a video decoding system 200 according to an embodiment of the present invention. As illustrated, the system 200 may include storage 210, a video frame selector 220, a coded picture buffer 230, a video decoder 240, a decoded picture buffer 250, a compositor 260 and a controller 280. Storage 210 is a memory device to store channel data for decoding. The video frame selector 220 may retrieve coded video data from storage 210 and provide it to the coded picture buffer 230 for processing. The video decoder 240 performs substantive video decoding to invert a coding process that had been applied at the encoder. The decoded picture buffer 250 may store decoded frames of the video sequence prior to display. As noted, frames are coded and decoded in an order that differs from the normal display order; frame reordering may be accomplished via the decoded picture buffer 250. Coded frame data may carry timestamps or other indicators of display order for each frame which are carried through the decode process and used by the decoded picture buffer 250 to reorder decoded video into proper display order. The compositor 260 may integrate decoded frames of video with perhaps other screen elements to complete a video display. The video decoder 200 is shown coupled to a display device 270. A controller 280 is shown to represent control functions that govern operation of the video decoder 200 to support the reverse playback mode discussed hereinbelow as well as any other playback modes that may be provided, such as normal play modes, fast forward modes, pause display modes, recurring loops modes and the like.

The video decoder 240 may include a frame decoder 240.1, a prediction mode selector 240.2 and a reference frame buffer 240.3. The reference frame buffer 240.3 may store data of decoded frames. Coded channel data identifies, for each frame in the coded video sequence, a frame type and further may include prediction reference information identifying types of prediction applied to frame elements such as blocks or macroblocks (herein, "pixelblocks"). The reference frame buffer 240.3 may store data of previously decoded reference frames and other data that establish a decode state of the video decoder 240. The prediction mode selector 240.2 may survey the coded channel data, identify a mode of prediction for a frame currently being decoded and furnish prediction data from the reference frame buffer to the frame decoder 240.1. The frame decoder 240.1 may generate decoded frame data based on coded data from the channel and prediction data from the reference frame buffer 240.3. In this regard, the operation of a video decoder 200 is well known.

FIG. 3 illustrates an exemplary video sequence 310 that may be coded and decoded according to embodiments of the present invention. The video sequence includes a plurality of frames representing video content of the video sequence 310. The frames are related to each other in a display order 320 as shown in FIG. 3. Video coders typically code video sequences to exploit spatial and temporal redundancies among the frames and generate a coded video sequence that has reduced bandwidth as compared to the original video sequence. As part of this coding process, frames within the video sequence are assigned frame types for coding purposes, defining how the frame is to be coded. The conventional H.264 coders, for example, assign one of the following frame types to each frame:

An intra-coded frame ("I frame") is a frame that is coded without reference to any other frame in the video sequence.

A predictively coded frame ("P frame") is a frame that is coded with reference to one or more other frames from the video sequence, all of which have earlier display times than the frame.

A bidirectionally coded frame ("B frame") is a frame that is coded with reference to one or more other frames from the video sequence, at least one of which has a later display time than the frame.

Thus, a single frame in a coded video sequence may refer to another frame therein as a source of prediction and also may be a prediction reference for other frames. To exploit temporal redundancies among the frames, frames from the video sequence 310 typically are coded in a coding order 330 that differs from the display order. For example, as shown in FIG. 3, a video coder may code an I frame at display position first, then code a P frame at display position 6 before coding B frames at intermediate display positions 3-5. The B frames would be coded using the I frame and P frame as prediction references. Thereafter, the video coder may advance to the P frame at display position 11 and code it before coding the B frames at display positions 7-10. The B frames at positions 7-10 would be coded using the P frames at display positions 6 and 11 as prediction references. The coding algorithm advances through video sequence 310 as shown in the example of FIG. 3 coding frames out-of-display order to achieve the coding efficiencies presented by exploiting temporal redundancies among the frames. Coded video data of the frames are placed in channel data in the order in which they are coded, which differs from the display order. Therefore, when video decoders recover the decoded video sequence from coded video data, they often buffer decoded frame data for frame re-ordering, a process in which the recovered video frames are reordered in display order 320 for display.

Embodiments of the present invention further classify frames of a video sequence to achieve reverse playback. Frames may be classified as "key frames," "reference frames" and "non-reference frames." For the purposes of the present discussion, a "key frame" is a frame within a coded video sequence coded in a manner that resets state of a video decoder 240 (FIG. 2) to a known value; video content of the key frame is generated without reference to any other frame, and coding parameters used during decode do not rely on any preceding frames. Further, video content of frames following the key frame (in coding order) is also generated without reference to any frames or associated coding parameters prior to the key frame (in coding order). Key frames, therefore, are I frames as discussed above. Depending on the coding algorithm used, however, not all I frames will be considered key frames. In the H.264 protocol, for example, some P frames may be decoded based on a coding state that a video decoder develops from frames that preceded the prior I frame; such an I frame is not a "key frame" within the meaning of the present discussion. For the purposes of the present discussion, "reference frames" are the remaining frames in a video sequence that are sources of prediction (or other coding parameters) for other frames therein; they may include P frames and any I frames that cannot be considered key frames. Remaining frames in the video sequence may be considered non-reference frames. It follows that non-reference frames are those frames which do not contribute to the state of the decoder for the purposes of decoding successive frames. FIG. 3 illustrates frames of the exemplary video sequence 310 classified as key frames 340, reference frames 350 and non-reference frames 360. Although this illustration, the key frames are I frames, the reference frames are P frames and the non-reference frames are B frames, this identification need not apply to all coding algorithms or all sequences.

Embodiments of the present invention also rely on a "group of pictures" (GOP) 370, which represents a collection of frames that extend in coding order 320 from a first key frame (say, the I frame at coding position 1) through to the frame that precedes the next key frame (the B frame at coding position 26). FIG. 3 illustrates the video sequence organized in ascending display order and therefore, the GOP 370 is shown as extending from the I frame at display position 1 to the P frame at display position 26; this is equivalent. When a new key frame is encountered in the coded video sequence, it begins a new GOP 370'.

FIG. 4 is a flow diagram of a method 400 for decoder control when a video decoder operates in a reverse playback mode. According to the method, a group of pictures may be divided in a set of S spans (box 410). The method operates iteratively on each span in reverse coding order, working back from a span that includes a current display position. For a span i, the method selects the key frame that marks the onset of the current GOP for decode and supplies it to the decoder (box 420). The method also selects reference frame(s) from the beginning of the GOP through to the onset of the current span i for decode (box 430). Thereafter, the method selects a number N of frames from span i for decode and marks them for display (box 440). The method also determines whether any of the reference frames from span i were omitted by the selection of box 440 (box 450). If so, the method selects the remaining reference frames from span i for decode (box 460). Although marked for decode, the reference frames selected at box 460 are not marked for display. Thus, the reference frames are decoded sufficiently to maintain the state of the decoder 340 but not included in the decoded picture buffer 350. Thereafter, all frames selected at boxes 440 and 460 are decoded and displayed/not displayed as so marked. Following decode, the method advances to the next span.

The method of FIG. 4 advantageously provides a reverse playback control method whose performance may be adjusted dynamically by control parameters S and N. The parameter S limits the number of spans that will be processed within a GOP. The parameter N determines a number of frames that are to be selected from each span for decode and display. The parameters may be tuned according to a mode of reverse playback that has been invoked. For example, many decoders provide reverse playback modes (2×, 4×, 8×) that represent multiples of a conventional reverse playback frame rate. Faster playback rates require generally fewer numbers of frames to be taken from each GOP, which often requires fewer spans S and fewer frames per span N to be taken from each GOP than when the decoder operates at a conventional reverse playback frame rate.

Owing to historical advance of video coding technologies and the availability of hardware decoders for some and software decoders for others, some codecs are more computationally expensive to decode than others. Also, a given device may be able to play video at a variety of sizes, and the computational complexity and the impact on available buffer memory will vary based on the size of video. Further, the importance of power consumption and heat dissipation rates may vary based on other circumstances, such as whether a device is running on battery or on mains current, or the ambient temperature. On a multi-purpose device, the buffer memory availability may vary depending on what other services are using that memory. Individual video decoders, therefore, may tailor selection of S and N values based on the respective decoder's capabilities, available resources and performance.

Where the choice of codec means that decoding is fast and so it is practical to decode more frames per second, a decoder may select a value of S that is larger than a default value to take advantage of the higher decode capability. If the video dimensions are small, a decoder may increase both S and N over default values. If it is important to reduce power consumption, however, a decoder may decrease S over a default value. If other operating conditions vary the available buffer memory, N may be varied accordingly.

Individual decoders often store data that define a model of their own capabilities and may derive values of S and N against estimate rates of decode. For example, a video decoder that is known to be able to decode and play a media file at 2× real-time display rate might set S to 2 when paying that kind of media. By contrast, another device incorporating a video decoder that can decode and play the same file at 4× real-time might set S to 4 for the same media.

In other embodiments, a decoder controller may analyze a media file to estimate factors such as the average and peak number of frames in a GOP, and the relative frequency of reference frames in a GOP. The decoder may derive values of S and N from these estimated factors. In some embodiments, these factors may be determined for each GOP, allowing the decoder to derive values of S and N for each GOP.

For each GOP, up to N frames of each of S spans will be displayed, giving a total limit of S*N. The number of additional frames decoded to prime decoder state can be estimated as $$\left(\left(\sum_{i=0}^{S-1} i\right) \cdot r \cdot F/S\right) + (S \cdot D)$$

where r is a factor representing a relative frequency of key and reference frames (i.e., r=0.5 if half of the frames are key or reference frames), F represents the number of frames in the GOP, and D represents an expected number of frames selected for decode but not display in box 460 (i.e., D=r*S−N, if r*S>N; 0, otherwise). In an embodiment, S may be derived from these equations to make the number of displayed frames as high as possible while keeping the number of additional decoded frames below a safe level.

In further embodiments, static models for derivation of S and N may be supplemented by dynamic performance monitoring. During operation, a decoder may monitor the rate of decode it achieves and dynamically adjust S and N at the method traverses GOPs. If the decoding work for a GOP completed in much less time than the time available for displaying decoded frames selected from that GOP, a decoder may increase S for the next GOP. If decoding of a GOP did not complete in time available for display, the implementation could decrease S for the next GOP.

During operation, it can occur that the selection of frames by step 440 when applied to a first span within a GOP can cause selection of the key frame at the onset of the GOP. The principles of the present invention permit the priming operation of step 420 to be omitted when the method operates on the first span of a GOP if the key frame is selected for display at step 440 because the key frame would be decoded at step 470. As long as the key frame is decoded once during processing of the first span, successful operation of the decoder will be achieved.

During operation, it also can occur that default selections of S and N may be made such that S*N>F, where F represents the number of frames present in a GOP being processed. In an embodiment, the value of S may be adjusted such that S=|F/N|.

FIGS. 5-7 illustrate application of the method of FIG. 4 to the exemplary GOP of FIG. 2. In this example, the GOP is shown as divided into three spans. Each iteration of the method works across the spans in reverse coding order, enabling selection and decode of frames therein.

Operation of a first iteration is shown in FIG. 5 to select and decode frames from span 3. There, method steps 420 and 430 primes the decoder by selecting the key frame at the onset of the GOP and the reference frames within spans 1 and 2. The selected key and reference frames are passed to the decoder for decode but not display and, in doing so, prime the decoder for processing of the span 3 frames (line 520). Thereafter, the method selects N frames from within span 3 for decode and display (line 530). In this example, we show every other frame as being selected. The frames selected at line 530 are marked as displayable. Thereafter, when the method searches for reference frames that were omitted by the selection shown in line 530, a P frame is detected. The omitted reference frame is selected for decode but not display (line 540). When the iteration concludes, the frames shown in line 540 are decoded but only the frames shown in line 530 are rendered at a display in the reverse playback mode.

FIG. 6 shows operation of the next iteration, which selects frames from span 2 for decode and display. During operation of method steps 420 and 430, the key frame and the reference frames from span 1 are selected again for decode but not display (line 620). These selected frames are passed to the decoder to establish decoding state for frames from span 2. Thereafter, the method selects N frames from within span 2 for decode and display (line 630). The method searches again for any reference frames from span 2 that were omitted from the selection shown in line 630. Again, a P reference will be identified; it is selected for decode but marked as non-displayable (line 640). When the iteration concludes, the frames shown in line 640 are decoded but only the frames shown in line 630 are rendered.

FIG. 7 shows operation of the final iteration, which selects frames from the first span for decode and display. During operation, the key frame is selected to prime the decoder (line 720). The method selects N frames from within the first span for decode and display (line 730). Thereafter, the method searches again for any reference frames from the first span that were omitted from the selection shown in line 730 (line 740). In the example of FIG. 7, no references frames would be selected because all reference frames happened to be selected during the prior selection. Therefore, all frames sent to the decoder would be marked for display during reverse playback mode.

Following processing of the GOP, the method may advance across other GOPs in reverse coding order (not shown in FIGS. 5-7) and repeat. Typically, the method will continue until the reverse playback mode concludes, for example, in response to operator control or the method reaches the start of the coded video sequences.

Returning to FIG. 2, operation of the method of FIG. 4 permits the video decode unit 340 to operate in a normal decoding mode according to a conventional coding order specified by channel data. The video decode unit 340 provides decoded frames to the decoded picture buffer 350 in coding order on a span-by-span basis. The decoded picture buffer 350 need only store the frames that are marked for display. Decoded reference frame and key frame data that are not marked for display may be discarded by the decoded picture buffer (although they are retained by the reference frame buffer 340.3 for further decode purposes). A compositor 260 retrieves decoded frame data in reverse display order and renders the decoded data on a display 270.

According to an embodiment, when selecting frames for decode and display (FIG. 4, box 440), the method may prioritize selection of reference frames as opposed to non-reference frames that appear in each span. Doing so may reduce overall processing load to the decoder because omitted reference frames will be selected for decode at box 450. Such a prioritization may affect the pattern of displayed frames during reverse playback and, therefore, such prioritization is optional.

Embodiments of the present invention also find application with video data coded according to "Open GOPs" (Open Groups of Pictures). When video data is coded by open GOPs, there is no single frame that completely resets a video decoder's coding state for the purpose of decoding all following frames. Therefore, no frame qualifies as a "key frame" under the definition provided above. Instead, coded video data includes a number of "partial key frames," which partially but not completely set the coding state of a decoder. For example, the known MPEG-2 coding protocol includes an Open GOP coding mode in this manner.

FIG. 8 illustrates an exemplary sequence 810 of video frames showing the Open GOP coding mode. Again, the sequence 810 may possess a display order 820 that differs from a coding order 830 that is applied at an encoder and a decoder. An Open GOP begins at the occurrence of a partial key frame 840 such as the I frames shown in FIG. 8 and concludes at the frame that immediately precedes the next partial key frame (in coding order). Each Open GOP may include one or more reference frames 850 and one or more non-reference frames 860. In the example of FIG. 8, GOP 870.1 is shown as including frames 1-9 in coding order, GOP 870.2 is shown as including frames 10-18 in coding order and GOP 870.3 is shown as including frames 19-27 in coding order.

Figure 9:
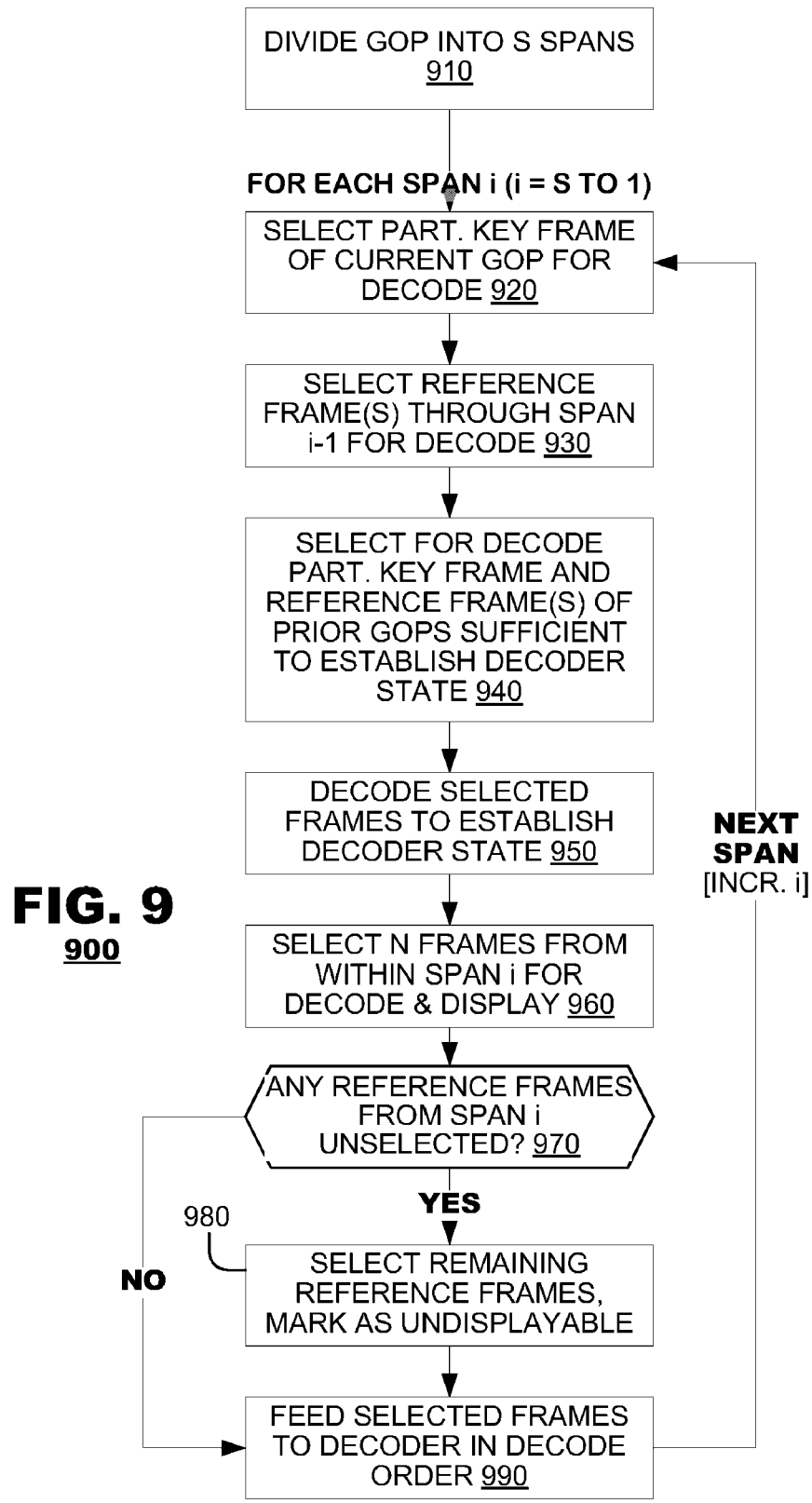
FIG. 9 is a flow diagram of a decoder control method according to an embodiment of the present invention.

FIG. 9 is a flow diagram of a method 900 for decoder control when a video decoder operates in a reverse playback mode and operates on coded video data that include open GOPs. When a decoder enters a reverse playback mode, it may divide a current GOP into a plurality of spans (box 910). The method operates iteratively on each span in reverse coding order, working back from a span that includes a current display position. For a span i, the method selects the partial key frame that marks the onset of the current GOP for decode and supplies it to the decoder (box 920). The method also selects reference frame(s) from the beginning of the GOP through to the onset of the current span i for decode (box 930). Thereafter, the method may select partial key frames and reference frame(s) from as many prior GOPs as are necessary to establish decoder state at the current display order (box 940). The frames selected at steps 920, 930 and 940 may be decoded in conventional coding order, which establishes decoding state for frames selected for display from the current span i (box 950).

Thereafter, the method may select a predetermined number of frames N from a current span i for decode and mark them for display (box 960). The method also may determine whether any of the reference frames from span i were omitted by the selection of box 960 (box 970). If so, the method selects the remaining reference frames from span i for decode (box 980). Although marked for decode, the reference frames selected at box 980 are not marked for display. Thus, the reference frames are decoded sufficiently to maintain the state of the decoder 340 but not included in the decoded picture buffer 350. Thereafter, all frames selected at boxes 970 and

980 are decoded and displayed/not displayed as so marked (box 990). Following decode, the method updates the current display count and advances to the next span.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A decoding method for coded video data, comprising:
  dividing a group of pictures into a plurality of spans, the coded video data representing frames of source video coded in a coding order, the group of pictures extending in coding order from a first key frame to a terminal frame that precedes another key frame in coding order,
  processing each span in reverse coding order, comprising:
  a) decoding the first key frame and any reference frames that precede the currently processed span in coding order,
  b) selecting a plurality of frames from the currently processed span for decode and display,
  c) selecting any reference frames from the currently processed span that are omitted by the selection of step b) for decode but not display, and
  d) decoding the frames selected by steps b) and c);
  displaying in reverse display order the decoded frames selected for display.

2. The method of claim 1, further comprising:
  estimating a decode processing rate of a decoder executing the method, and
  selecting a number of spans into which the group of pictures is divided based on the estimated decode processing rate.

3. The method of claim 1, further comprising:
  estimating an average frequency of reference frames in a group of pictures, and
  selecting a number of spans into which the group of pictures is divided based on the estimated frequency.

4. The method of claim 1, further comprising:
  before operation of the processing step, estimating a number of frames to be decoded at steps a) and d), and
  selecting a number of spans into which the group of pictures is divided based on the estimated number of frames.

5. A control method for a video decoder for providing a reverse playback mode for a video sequence recovered from coded video data, the method comprising:
  when a reverse playback command is received, determining a frame currently displayed at a video decoder,
  determining a group of pictures to which the currently displayed frame belongs, the group of pictures extending in coding order from a first key frame to a terminal frame that precedes another key frame in coding order,
  1) dividing the group of pictures into a plurality of spans,
  2) processing each span in reverse coding order, starting from a span that includes the currently displayed frame, comprising:
    a) priming the video decoder by decoding the first key frame and any reference frames that precede the currently processed span in coding order,
    b) selecting a plurality of frames from the currently processed span for decode and display,
    c) selecting any reference frames from the currently processed span that are omitted by the selection of step b) for decode but not display,
    d) decoding the frames selected by steps b) and c), and
    e) displaying in reverse display order the decoded frames selected for display;
  advancing the control method to further groups of pictures in reverse coding order and repeating steps 1) and 2) until the reverse playback mode concludes.

6. The method of claim 5, further comprising:
  estimating a decode processing rate of a decoder executing the method, and
  selecting a number of spans into which the group of pictures is divided based on the estimated decode processing rate.

7. The method of claim 5, further comprising:
  estimating an average frequency of reference frames in a group of pictures, and
  selecting a number of spans into which the group of pictures is divided based on the estimated frequency.

8. The method of claim 5, further comprising:
  before operation of the processing step, estimating a number of frames to be decoded at steps a) and d), and
  selecting a number of spans into which the group of pictures is divided based on the estimated number of frames.

9. The method of claim 5, wherein each group of pictures is divided into a number of spans that changes from group of pictures to group of pictures according to a predetermined metric.

10. A video decoding system having a reverse playback mode, comprising:
  a video frame selector to select data representing coded frames of video for decode from received channel data,
  a first buffer to store coded frame data selected by the video frame selector,
  a video decoder to generate decoded frame data from coded frame data according to prediction chains established among the coded frame data,
  a second buffer to store decoded frame data from the video decoder,
  a compositor to select and render video data on a display device, and
  a controller, responsive to a command to enter a reverse playback mode, to:
    identify groups of pictures from channel data according to the prediction chains, the group of pictures extending in coding order from a first key frame to a terminal frame that precedes another key frame in coding order,
    until the reverse playback mode concludes, process each group of pictures in reverse coding order by:
      dividing a current group of pictures into a plurality of spans,
      for each span, considered in reverse coding order:
        a) cause the video frame selector to select for decoding the first key frame and any reference frames that precede the currently considered span in coding order,
        b) cause the video frame selector to further select a plurality of frames from the currently processed span for decode,
        c) mark the frames selected at b) for display,
        d) cause the video frame selector to further select any reference frames from the currently processed span omitted by the selection at b) for decode,
        e) cause the video decoder to decode the frames selected by a), b) and d), and f) cause the coded picture buffer to display in reverse display order the decoded frames selected at b).

11. The system of claim 10, wherein the controller further:
estimates a decode processing rate of a decoder executing the method, and
selects a number of spans into which the group of pictures is divided based on the estimated decode processing rate.

12. The system of claim 10, wherein the controller further:
estimates an average frequency of reference frames in a group of pictures, and
selects a number of spans into which the group of pictures is divided based on the estimated frequency.

13. The system of claim 10, wherein the controller further:
before operation of the processing step, estimating a number of frames to be decoded at step e), and
selects a number of spans into which the group of pictures is divided based on the estimated number of frames.

14. The system of claim 10, wherein each group of pictures is divided into a number of spans that changes from group of pictures to group of pictures according to a predetermined metric.

15. A decoding method for coded video data in a reverse playback mode, comprising:
dividing a group of pictures into a plurality of spans, the coded video data representing frames of source video coded in a coding order, the group of pictures extending in coding order from a first partial key frame to a terminal frame that precedes another partial key frame in coding order,
processing each span in reverse coding order, comprising:
a) selecting the first partial key frame and any reference frames that precede the currently processed span in coding order,
b) selecting, from a prior group of pictures in coding order, a second partial key frame and any reference frames included in the prior group of pictures,
c) decoding the frames selected according to sub-steps a) and b) to establish decoding state for the current span,
d) selecting a plurality of frames from the currently processed span for decode and display,
e) selecting any reference frames from the currently processed span that are omitted by the selection of step d) for decode but not display, and
f) decoding the frames selected by steps d) and e);
displaying in reverse display order the decoded frames selected for display.

16. The method of claim 15, further comprising:
estimating a decode processing rate of a decoder executing the method, and
selecting a number of spans into which the group of pictures is divided based on the estimated decode processing rate.

17. The method of claim 15, further comprising:
estimating an average frequency of reference frames in a group of pictures, and
selecting a number of spans into which the group of pictures is divided based on the estimated frequency.

18. The method of claim 15, further comprising:
before operation of the processing step, estimating a number of frames to be decoded at steps c) and f), and
selecting a number of spans into which the group of pictures is divided based on the estimated number of frames.

19. A control method for a video decoder for providing a reverse playback mode for a video sequence recovered from coded video data, the method comprising:
when a reverse playback command is received, determining a frame currently displayed at a video decoder,
determining a current group of pictures to which the currently displayed frame belongs, the current group of pictures extending in coding order from a first partial key frame to a terminal frame that precedes another partial key frame in coding order,
1) dividing the current group of pictures into a plurality of spans,
2) processing each span in reverse coding order, starting from a span that includes the currently displayed frame, comprising:
a) priming the video decoder, comprising:
i) selecting for decode, from a second group of pictures that precedes the current group of pictures in coding order, a second partial key frame and any reference frames included therein,
ii) selecting for decode, from the current group of pictures, the first key frame and any reference frames that precede the currently processed span in coding order,
iii) decoding the frames selected according to sub-steps i) and ii) to establish decoding state for the current span,
b) selecting a plurality of frames from the currently processed span for decode and display,
c) selecting any reference frames from the currently processed span that are omitted by the selection of step b) for decode but not display,
d) decoding the frames selected by steps b) and c), and
e) displaying in reverse display order the decoded frames selected for display;
advancing the control method to further groups of pictures in reverse coding order and repeating steps 1) and 2) until the reverse playback mode concludes.

20. The method of claim 19, further comprising:
estimating a decode processing rate of a decoder executing the method, and
selecting a number of spans into which the group of pictures is divided based on the estimated decode processing rate.

21. The method of claim 19, further comprising:
estimating an average frequency of reference frames in a group of pictures, and
selecting a number of spans into which the group of pictures is divided based on the estimated frequency.

22. The method of claim 19, further comprising:
before operation of the processing step, estimating a number of frames to be decoded at sub-steps a) and d), and
selecting a number of spans into which the group of pictures is divided based on the estimated number of frames.

23. The method of claim 19, wherein each group of pictures is divided into a number of spans that changes from group of pictures to group of pictures according to a predetermined metric.

24. A video decoding system having a reverse playback mode, comprising:
a video frame selector to select data representing coded frames of video for decode from received channel data,
a first buffer to store coded frame data selected by the video frame selector, a video decoder to generate decoded frame data from coded frame data according to prediction chains established among the coded frame data, a second buffer to store decoded frame data from the video decoder, a compositor to select and render video data on a display device, and a controller, responsive to a command to enter a reverse playback mode, to:

identify group of pictures from channel data according to the prediction chains, the group of pictures extending in coding order from a first partial key frame to a terminal frame that precedes another partial key frame in coding order, until the reverse playback mode concludes, process each group of pictures in reverse coding order by:

dividing a current group of pictures into a plurality of spans, for each span, considered in reverse coding order and starting with a span that includes a currently displayed frame:

a) cause the video frame selector to prime the video decoder by:

i) selecting for decode, from a second group of pictures that precedes the current group of pictures in coding order, a second partial key frame and any reference frames included therein, ii) selecting for decode, from the current group of pictures, the first key frame and any reference frames that precede the currently processed span in coding order, iii) cause the video decoder to decode the frames selected according i) and ii), b) cause the video frame selector to further select a plurality of frames from the currently processed span for decode, c) mark the frames selected at b) for display, d) cause the video frame selector to further select any reference frames from the currently processed span omitted by the selection at b) for decode, e) cause the video decoder to decode the frames selected by b) and d), and f) cause the coded picture buffer to display in reverse display order the decoded frames selected at b).

25. The system of claim 24, wherein the controller further:

estimates a decode processing rate of a decoder executing the method, and selects a number of spans into which the group of pictures is divided based on the estimated decode processing rate.

26. The system of claim 24, wherein the controller further:

estimates an average frequency of reference frames in a group of pictures, and selects a number of spans into which the group of pictures is divided based on the estimated frequency.

27. The system of claim 24, wherein the controller further:

before operation of the process operation, estimates a number of frames to be decoded at a) and e), and selects a number of spans into which the group of pictures is divided based on the estimated number of frames.

28. The system of claim 24, wherein each group of pictures is divided into a number of spans that changes from group of pictures to group of pictures according to a predetermined metric.

* * * * *